(12) United States Patent
Przybyl et al.

(10) Patent No.: US 10,766,592 B1
(45) Date of Patent: Sep. 8, 2020

(54) SYSTEM AND METHOD FOR CONTROLLING A MULTI-SPEED TRANSMISSION ON A MARINE ENGINE

(71) Applicant: Brunswick Corporation, Mettawa, IL (US)

(72) Inventors: Andrew J. Przybyl, Berlin, WI (US); Justin R. Poirier, Fond du Lac, WI (US); David M. Van Buren, Fond du Lac, WI (US)

(73) Assignee: Brunswick Corporation, Mettawa, IL (US)

(*) Notice: Subject to any disclaimer, the term of this patent is extended or adjusted under 35 U.S.C. 154(b) by 170 days.

(21) Appl. No.: 16/114,325

(22) Filed: Aug. 28, 2018

(51) Int. Cl.
| | | |
|---|---|---|
| *B63H 21/21* | (2006.01) | |
| *F02B 61/06* | (2006.01) | |
| *F02D 25/02* | (2006.01) | |
| *F16H 61/68* | (2006.01) | |
| *F02B 61/04* | (2006.01) | |
| *F16H 61/00* | (2006.01) | |
| *F16H 3/091* | (2006.01) | |

(52) U.S. Cl.
CPC ......... *B63H 21/21* (2013.01); *F02B 61/045* (2013.01); *F02B 61/06* (2013.01); *F02D 25/02* (2013.01); *F16H 61/68* (2013.01); *B63H 2021/216* (2013.01); *F16H 3/091* (2013.01); *F16H 2061/0075* (2013.01); *F16H 2200/0034* (2013.01); *F16H 2708/22* (2013.01)

(58) Field of Classification Search
CPC ...... B63H 20/14; B63H 21/21; B63H 21/213; B63H 21/28; B63H 23/06; B63H 23/28; B63H 23/30; B63H 2021/216; F02B 61/00; F02B 61/045; F02B 61/06; F02D 25/02

See application file for complete search history.

(56) References Cited

U.S. PATENT DOCUMENTS

| | | | |
|---|---|---|---|
| 4,173,939 A | 11/1979 | Strang | |
| 4,318,699 A * | 3/1982 | Wenstadt | B63H 20/10 114/277 |
| 4,323,354 A | 4/1982 | Blanchard | |

(Continued)

FOREIGN PATENT DOCUMENTS

| | | |
|---|---|---|
| DE | 2544338 | 4/1977 |
| JP | 2010173447 A * | 8/2010 |

(Continued)

OTHER PUBLICATIONS

EPO machine translation of JP 2011-127669 (original JP document published Jun. 30, 2011) (Year: 2011).*

(Continued)

*Primary Examiner* — Faris S Almatrahi
*Assistant Examiner* — David A Testardi
(74) *Attorney, Agent, or Firm* — Andrus Intellectual Property Law, LLP (57) ABSTRACT

A method for controlling a multi-speed transmission for an engine powering a marine propulsion device on a marine vessel is disclosed. The method is carried out by a control module and includes determining a load of the engine, determining speed of the engine, and determining a pitch of the marine vessel. The method includes switching between a first gear ratio and a second gear ratio of the transmission based on the engine load, the engine speed, and the vessel pitch.

19 Claims, 4 Drawing Sheets

(56) References Cited

U.S. PATENT DOCUMENTS

| | | | |
|---|---|---|---|
| 4,767,363 A * | 8/1988 | Uchida | G05D 1/0206 114/144 E |
| 4,926,778 A * | 5/1990 | Johnston | B63B 1/322 114/121 |
| 4,931,025 A * | 6/1990 | Torigai | G05D 1/0875 440/1 |
| 4,964,276 A * | 10/1990 | Sturdy | F02D 25/02 60/700 |
| 5,118,315 A * | 6/1992 | Funami | B63H 20/08 440/1 |
| 5,408,948 A * | 4/1995 | Arii | B63B 1/286 114/274 |
| 5,711,742 A | 1/1998 | Leinonen et al. | |
| 6,233,943 B1 * | 5/2001 | Beacom | F02B 61/045 60/706 |
| 6,478,715 B1 | 11/2002 | Hunold | |
| 6,487,923 B1 | 12/2002 | Hunold | |
| 6,554,663 B2 | 4/2003 | Neisen | |
| 7,082,932 B1 | 8/2006 | Crane | |
| 7,722,500 B2 | 5/2010 | Sato et al. | |
| 7,891,263 B2 | 2/2011 | Mowbray et al. | |
| 8,016,626 B2 | 9/2011 | Suzuki et al. | |
| 8,439,800 B1 | 5/2013 | Bazan et al. | |
| 8,641,462 B2 | 2/2014 | Kuriyagawa | |
| 8,690,621 B2 | 4/2014 | Kuriyagawa et al. | |
| 8,740,659 B2 | 6/2014 | Kuriyagawa et al. | |
| 8,764,500 B2 | 7/2014 | Kuriyagawa et al. | |
| 9,039,468 B1 * | 5/2015 | Arbuckle | B63H 21/213 440/1 |
| 9,133,910 B1 | 9/2015 | Vanselous et al. | |
| 9,278,740 B1 * | 3/2016 | Andrasko | G05D 1/0875 |
| 9,376,196 B2 | 6/2016 | Kuriyagawa et al. | |
| 9,441,724 B1 | 9/2016 | Pugh | |
| 9,446,829 B1 | 9/2016 | Williams et al. | |
| 9,545,987 B1 * | 1/2017 | Przybyl | F02D 25/00 |
| 9,878,768 B1 | 1/2018 | VanSelous et al. | |
| 10,048,690 B1 * | 8/2018 | Hilbert | B63H 21/21 |
| 2002/0187877 A1 | 12/2002 | Skupinski et al. | |
| 2004/0064224 A1 | 4/2004 | Hasler et al. | |
| 2005/0284446 A1 * | 12/2005 | Okuyama | B63H 21/22 123/350 |
| 2006/0009096 A1 * | 1/2006 | Takada | B63H 21/213 440/84 |
| 2008/0295591 A1 * | 12/2008 | Zhang | G01C 9/08 73/204.27 |
| 2009/0209145 A1 * | 8/2009 | Suzuki | B63H 23/02 440/1 |
| 2009/0209151 A1 * | 8/2009 | Suzuki | B63H 21/213 440/86 |
| 2009/0221193 A1 * | 9/2009 | Suzuki | B63H 20/14 440/1 |
| 2010/0099310 A1 * | 4/2010 | Kuriyagawa | B63H 20/14 440/1 |
| 2011/0143609 A1 * | 6/2011 | Kuriyagawa | B63H 21/265 440/86 |
| 2011/0143610 A1 * | 6/2011 | Kuriyagawa | B63H 21/22 440/86 |
| 2011/0217886 A1 * | 9/2011 | Kuriyagawa | B63H 21/21 440/1 |
| 2011/0217888 A1 * | 9/2011 | Kuriyagawa | B63H 20/14 440/86 |
| 2011/0294375 A1 * | 12/2011 | Kuriyagawa | B63H 20/14 440/1 |
| 2013/0035009 A1 * | 2/2013 | Kuriyagawa | B63H 21/21 440/1 |
| 2014/0141663 A1 * | 5/2014 | Kuriyagawa | B63H 20/20 440/1 |
| 2014/0229083 A1 | 8/2014 | Leehaug et al. | |
| 2014/0295717 A1 * | 10/2014 | Kuriyagawa | B63H 20/10 440/1 |

FOREIGN PATENT DOCUMENTS

| | | | |
|---|---|---|---|
| JP | 2011127669 A * | 6/2011 | |
| WO | WO 2002085703 | 10/2002 | |

OTHER PUBLICATIONS

SAE lesson plan, "Developing the gear ratio formula", 2017, 8 pages, downloaded from: https://www.sae.org/binaries/content/assets/cm/content/learn/education/motortoycar-samplelessonplan.pdf (Year: 2017).*

* cited by examiner

SYSTEM AND METHOD FOR CONTROLLING A MULTI-SPEED TRANSMISSION ON A MARINE ENGINE

FIELD

The present disclosure relates to systems and methods for controlling multi-speed transmissions for engines powering marine propulsion devices on a marine vessel.

BACKGROUND

U.S. Pat. No. 5,711,742 discloses a marine propulsion system, preferably having dual counterrotating propellers, having an automatic multi-speed shifting mechanism such as a transmission. An electronic controller monitors engine parameters such as engine revolution speed and load, and generates a control signal in response thereto, which is used to control shifting. Engine load is preferably monitored by sensing engine manifold air pressure. The electronic controller preferably has a shift parameter matrix stored within a programmable memory for comparing engine speed and engine load data to generate the control signal. The system can also have a manual override switch to override shifting of the shifting mechanism.

U.S. Pat. No. 7,082,932 discloses a method in which a marine propulsion system with a charge air compressor is controlled through the use of a clutch or a multiple speed transmission that allows the charge air compressor to be engaged or disengaged. The engagement or disengagement of the charge air compressor can be a dual function of the demand for a change in torque and the engine speed.

U.S. Pat. No. 9,441,724 discloses a method of monitoring and controlling a transmission in a marine propulsion device comprising the steps of receiving a rotational input speed of an input shaft to the transmission, receiving a rotational output speed of an output shaft from the transmission, receiving a shift actuator position value, and receiving an engine torque value. The method further comprises calculating a speed differential based on the input speed and the output speed, and generating a slip profile based on a range of speed differentials, engine torque values, and shift actuator position values.

U.S. Pat. No. 9,878,768 discloses a marine transmission including a synchronizer on a counter rotating shaft to shift into a high speed gear. The synchronizer includes friction surfaces on both sides of the gear body for the high speed gear. The high speed gear mesh is helical and generates axial force that enhances the torque carrying capacity of synchronizing friction surfaces, thereby enabling the shifting into the high speed gear without torque interrupt.

The above-noted patents are hereby incorporated by reference herein, in their entireties.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, a method is provided for controlling a multi-speed transmission for an engine powering a marine propulsion device on a marine vessel. The method is carried out by a control module and includes determining a load of the engine, determining speed of the engine, and determining a pitch of the marine vessel. The method includes switching between a first gear ratio and a second gear ratio of the transmission based on the engine load, the engine speed, and the vessel pitch.

According to another example of the present disclosure, a marine propulsion system for a marine vessel includes an engine, a propeller configured to be coupled in torque-transmitting relationship with the engine, and a transmission configured to transmit torque from the engine to the propeller at one of at least a first gear ratio and a second gear ratio. An engine speed sensor measures the speed of the engine. A vessel pitch sensor measures the pitch of the marine vessel. A control module is in signal communication with the engine speed sensor and the vessel pitch sensor. The control module causes the transmission to switch between transmitting torque at the first gear ratio and transmitting torque at the second gear ratio based on a load on the engine, the engine speed, and the vessel pitch. The control module causes the transmission to transmit torque at the first gear ratio in response to the vessel pitch indicating that the marine vessel is off-plane. The control module causes the transmission to transmit torque at the second gear ratio in response to the vessel pitch indicating that the marine vessel is on-plane.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

Figure 1:
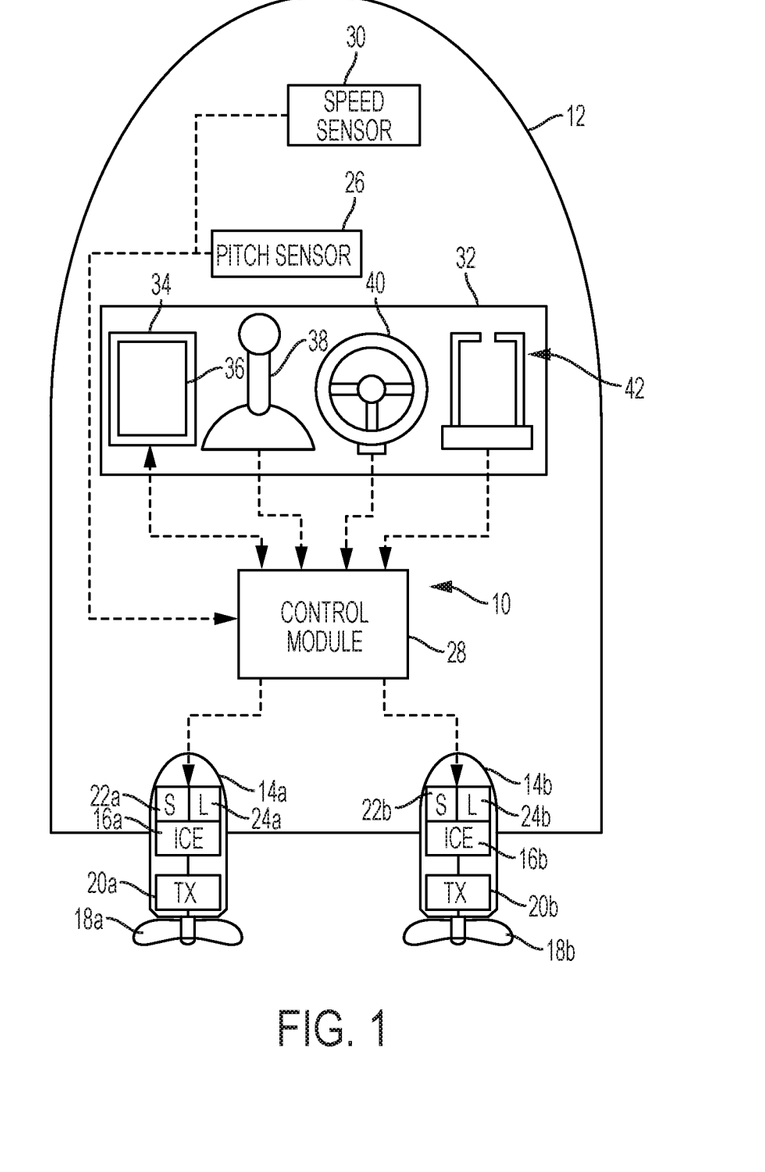
FIG. 1 illustrates one example of a marine vessel including a marine propulsion system according to the present disclosure.

FIG. 1 illustrates a marine propulsion system 10 for a marine vessel 12. The marine propulsion system 10 includes two marine propulsion devices 14a, 14b, but one or more than two marine propulsion devices could instead be provided. The marine propulsion devices 14a, 14b shown herein are outboard motors, but the marine propulsion devices could instead be inboard motors, stern drives, pod drives, jet drives, etc. Each marine propulsion device 14a, 14b includes an engine 16a or 16b. The engines 16a, 16b shown here are internal combustion engines, which may be, for example, gasoline or diesel engines. Each marine propulsion device 14a, 14b also includes a propeller 18a or 18b configured to be coupled in torque-transmitting relationship with a respective engine 16a or 16b. Such torque-transmitting relationship is more specifically provided by way of a transmission 20a or 20b configured to transmit torque from a respective engine 16a or 16b to a respective propeller 18a or 18b. As will be described further herein below with respect to FIG. 2, each transmission 20a, 20b is configured to transmit torque from the engine 16a or 16b to the propeller 18a or 18b at one of at least a first gear ratio and a second gear ratio, although additional gear ratios such as, for example, third, fourth, fifth, etc. gear ratios could be provided.

The marine propulsion system 10 further includes an engine speed sensor 22a or 22b measuring a speed of a respective engine 16a or 16b. In one example, the engine speed sensors 22a, 22b may be tachometers, which measure a speed of the engine 16a or 16b in rotations per minute (RPM), as is known to those having ordinary skill in the art. Each marine propulsion device 14a, 14b is also provided with an engine load sensor 24a or 24b measuring a condition indicative of an engine load. Each engine load sensor 24a, 24b can be a pressure sensor sensing a pressure of air in an intake manifold of the engine 16a or 16b or a throttle valve sensor measuring a position of a throttle valve of the engine 16a or 16b. The pressure sensor could be a manifold absolute pressure sensor (MAP sensor) or a mass air flow sensor (MAF sensor). In an alternative embodiment, the load on the engines 16a, 16b could be determined from a known fuel per cycle (FPC) value provided to each engine. In still other examples, the load on the engines 16a, 16b could be determined from a combination of pressure, throttle valve position, and/or FPC, according to a calibrated input/output function or look-up table.

The marine propulsion system 10 also includes a vessel pitch sensor 26 measuring a pitch of the marine vessel 12. The vessel pitch sensor 26 can be part of a motion reference unit (MRU) that includes accelerometers and MEMS angular rate gyros. Alternatively, the vessel pitch sensor 26 can be part of an inertial measurement unit (IMU), which may have a solid state, rate gyro electronic compass that indicates the vessel heading and solid state accelerometers and angular rate sensors that sense the vessel's attitude and rate of turn. Specifically, the IMU may include a 3-axis accelerometer, a 3-axis gyrometer, and a 3-axis magnetometer, and measures the acceleration, orientation, and direction of the marine vessel 12 in nine degrees of freedom. For example, angular accelerometers can be used to measure vessel pitch, yaw, and roll.

The marine propulsion system 10 also includes a control module 28 in signal communication with the engine speed sensors 22a, 22b, the vessel pitch sensor 26, the engine load sensors 24a, 24b, the engines 16a, 16b themselves, and the transmissions 20a, 20b, as well as other components noted herein below. The control module 28 is programmable and includes a processor and a memory. The control module 28 can be located anywhere in the marine propulsion system 10 and/or located remote from the marine propulsion system 10 and can communicate with various components of the marine vessel 12 via a peripheral interface and wired and/or wireless links, as will be explained further herein below. Although FIG. 1 shows one control module, the marine propulsion system 10 can include more than one control module. Portions of the method disclosed herein below can be carried out by a single control module or by several separate control modules. For example, the marine propulsion system 10 can have control modules located at or near a helm 32 of the marine vessel 12 and can also have control module(s) located at or near the marine propulsion devices 14a, 14b. If more than one control module is provided, each can control operation of a specific device or sub-system on the marine vessel.

In some examples, the control module 28 may include a computing system that includes a processing system, storage system, software, and input/output (I/O) interfaces for communicating with peripheral devices. The systems may be implemented in hardware and/or software that carries out a programmed set of instructions. For example, the processing system loads and executes software from the storage system, such as software programmed with a method for controlling a multi-speed transmission for the engine(s) of the marine propulsion device(s), which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software program modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 28 communicates with one or more components of the marine propulsion system 10 via the I/O interfaces and a communication link, which can be a wired or wireless link. The control module 28 is capable of monitoring and controlling one or more operational characteristics of the marine propulsion system 10 and its various subsystems by sending and receiving control signals via the communication link. In one example, the communication link is a controller area network (CAN) bus, but other types of links could be used. It should be noted that the extent of connections of the communication link shown herein is for schematic purposes only, and the communication link in fact provides communication between the control module 28 and each of the peripheral devices noted herein, although not every connection is shown in the drawing for purposes of clarity.

The marine propulsion system 10 also includes a vessel speed sensor 30 providing a speed of the marine vessel 12 to the control module 28. The vessel speed sensor 30 can be any known speed sensor such as a Pitot tube, a paddle wheel, or a global positioning system (GPS) that measures distance travelled over a given period of time. In one example, the vessel pitch sensor 26 and the vessel speed sensor 30 are provided together in a GPS-enabled IMU or in a single unit known as an attitude and heading reference system (AHRS). An AHRS provides 3D orientation of the marine vessel 12 by integrating gyroscopic measurements, accelerometer data, and magnetometer data.

Further, the marine propulsion system 10 includes a number of operator input devices located at the helm 32 of the marine vessel 12. The operator input devices include a multi-functional display device 34 including a user interface 36. The user interface 36 may be an interactive, touch-capable display screen, a keypad, a display screen and keypad combination, a track ball and display screen combination, or any other type of user interface known to those having ordinary skill in the art for communicating with a multi-functional display device 34. A joystick 38 is also provided at the helm 32 and allows an operator of the marine vessel 12 to command the marine vessel 12 to translate or rotate in any number of directions, such as by tilting or twisting the handle of the joystick 38, as is known to those having ordinary skill in the art. A steering wheel 40 is provided for providing steering commands to the marine propulsion devices 14a, 14b or to a rudder, in the event that the marine propulsion devices are not steerable. A throttle lever 42 is also provided for providing thrust commands, including both a magnitude and a direction of thrust, to the control module 28. Here, two throttle levers are shown, each of which can be used to control one of the marine propulsion devices 14a or 14b, although the two levers can be controlled together as a single lever. Alternatively, a single lever could be provided for controlling both marine propulsion devices 14a, 14b. Several of the operator input devices at the helm 32 can be used to input an operator demand on the engines 16a, 16b to the control module 28, including the user interface 36 of the multi-functional display device 34, the joystick 38, and the throttle lever 42. By way of example, a rotation of the throttle lever 42 in a forward direction away from its neutral, detent position could be interpreted as a value from 0% to 100% operator demand corresponding via an input/output map, such as a look up table, to a position of the throttle valves of the engines 16a, 16b. For example, the input/output map might dictate that the throttle valves are fully closed when the throttle lever 42 is in the forward, detent position (i.e., 0% demand), and are fully open when the throttle lever 42 is pushed forward to its furthest extent (i.e., 100% demand).

Figure 2:
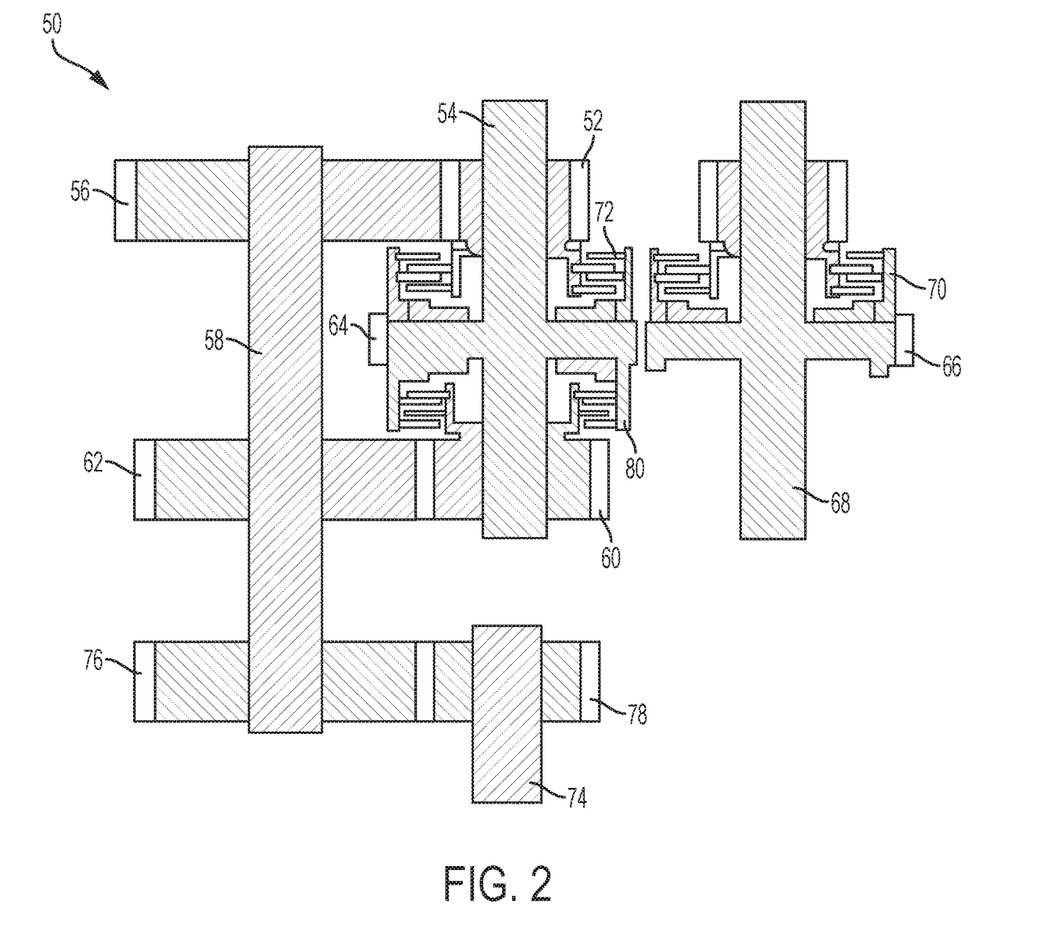
FIG. 2 is a schematic illustrating one example of a multi-speed transmission for an engine powering a marine propulsion device according to the present disclosure.

One schematic example of a multi-speed transmission 50 (i.e., transmission 20a or 20b) is shown in FIG. 2. The transmission 50 shown herein is a two-speed layshaft transmission, but other transmissions, such as epicyclic (planetary), dual-clutch, continuously variable, or of other known type could be used. Additionally, more than two gear ratios could be provided. The transmission 50 shown herein has two gear ratios, provided by a first input gear 52 on input shaft 54 (which is coupled to an output shaft of the engine 16a or 16b, as is known) and a first counter gear 56 on countershaft 58, and by a second input gear 60 and a second counter gear 62. A reverse gear 64 is also provided on input shaft 54, and meshes with gear 66 on reverse shaft 68, but will not be described further herein, other than to say reverse rotation of the propeller 18a or 18b is accomplished by way of actuating reverse clutch 70.

A first-gear clutch 72 is provided for placing the transmission 50 in first gear, such that first input gear 52 and first counter gear 56 transmit torque to output shaft 74 via output counter gear 76 and output gear 78 at a first gear ratio. A second-gear clutch 80 is provided for placing the transmission 50 in second gear, such that second input gear 60 and second counter gear 62 transmit torque to output shaft 74 via output counter gear 76 and output gear 78 at a second gear ratio. In one example, the first gear ratio is higher than the second gear ratio. Thus, when the transmission 50 transmits torque from the engine 16a or 16b, via the input shaft 54, the first gears 52, 56, the output gears 76, 78, and the output shaft 74 to the propeller 18a or 18b (via a propeller shaft) the transmission 50 provides more torque and less speed than it would provide were it to be placed in second gear, engine input speed being equal. Note that the clutches 70, 72, 80 shown herein are multi-plate wet disc clutches, but they could be other types, such as single-plate dry clutches, electromagnetic or electrohydraulic clutches, dog clutches, etc.

According to the present disclosure, the control module 28 controls the gear ratio at which the transmission 20a or 20b transmits torque according to operating conditions of the marine vessel 12. In one example, the control module 28 causes the transmission 20a or 20b to switch between transmitting torque at the first gear ratio and transmitting torque at the second gear ratio based on the load on the respective engine 16a or 16b, the respective engine's speed, and the vessel pitch. In another example, the control module 28 causes the transmission 20a or 20b to switch between transmitting torque at the first gear ratio and transmitting torque at the second gear ratio based on the respective engine's load, the respective engine's speed, the vessel pitch, and the operator demand. In another example, as will be described further herein below, the control module 28 estimates a slip of each propeller 18a, 18b based on the vessel speed, a pitch of the respective propeller 18a, 18b, and a value of at least one of the first gear ratio and the second gear ratio. The control module 28 causes the transmission 20a or 20b to switch between transmitting torque at the first gear ratio and transmitting torque at the second gear ratio based on the respective engine's load, the respective engine's speed, the vessel pitch, and the respective propeller's slip. In yet another example, the control module 28 causes the transmission 20a or 20b to switch between transmitting torque at the first gear ratio and transmitting torque at the second gear ratio based on the respective engine's load, the respective engine's speed, the vessel pitch, the operator demand, and the respective propeller's slip.

During research and development of engines associated with transmissions including at least first and second gear ratios, the present inventors developed strategies to balance fuel economy, performance, hole shot, and durability of the transmissions. The present inventors have discovered that an optimal time to shift the transmission from operating at the first gear ratio to operating at the second gear ratio is just after the marine vessel 12 rolls over on-plane. At this time, the propellers 18a, 18b are still slipping and the marine vessel 12 is in a transient state. The slip of the propellers 18a, 18b will act similarly to a torque converter. Additionally, there is generally a lot of ambient noise and vessel attitude dynamics, so any engine speed drop or torque fluctuations occurring as a result of shifting the transmissions 20a, 20b will likely not be felt or will not have a great impact on the operator of the marine vessel 12. Therefore, according to the present disclosure, the control module 28 causes the transmissions 20a, 20b to transmit torque at the first gear ratio (e.g., the higher gear ratio) in response to the vessel pitch indicating that the marine vessel 12 is off-plane and causes the transmissions 20a, 20b to transmit torque at the second gear ratio (e.g., the lower gear ratio) in response to the vessel pitch indicating that the marine vessel 12 is on-plane.

Figure 3:
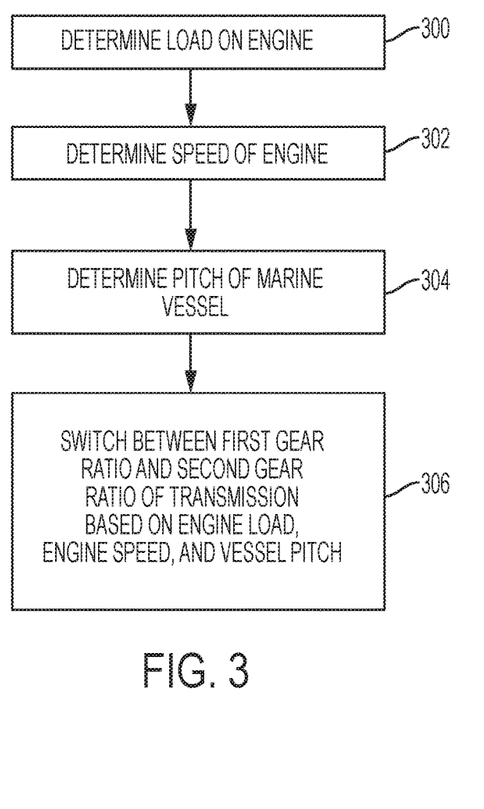
FIG. 3 illustrates one example of a method for controlling the multi-speed transmission according to the present disclosure.

FIG. 3 illustrates one example of a method for controlling a multi-speed transmission 20a or 20b for an engine 16a or 16b powering a marine propulsion device 14a or 14b on the marine vessel 12. The method is carried out by the control module 28 and includes, as shown at 300, determining a load on the engine 16a or 16b. The load can be determined by way of the engine load sensor 24a or 24b, as described hereinabove. As shown at 302, the method includes determining a speed of the engine 16a or 16b, which can be done using the engine speed sensor 22a or 22b, as described hereinabove. The method also includes determining a pitch of the marine vessel 12, such as by way of the vessel pitch sensor 26, as also described hereinabove. Note that any of the steps 300, 302, 304 can be performed simultaneously, or in an order other than that shown herein. As shown at 306, the method next includes switching between the first gear ratio and the second gear ratio of the transmission 20a or 20b based on the engine load from 300, the engine speed from 302, and the vessel pitch from 304.

Figure 4:
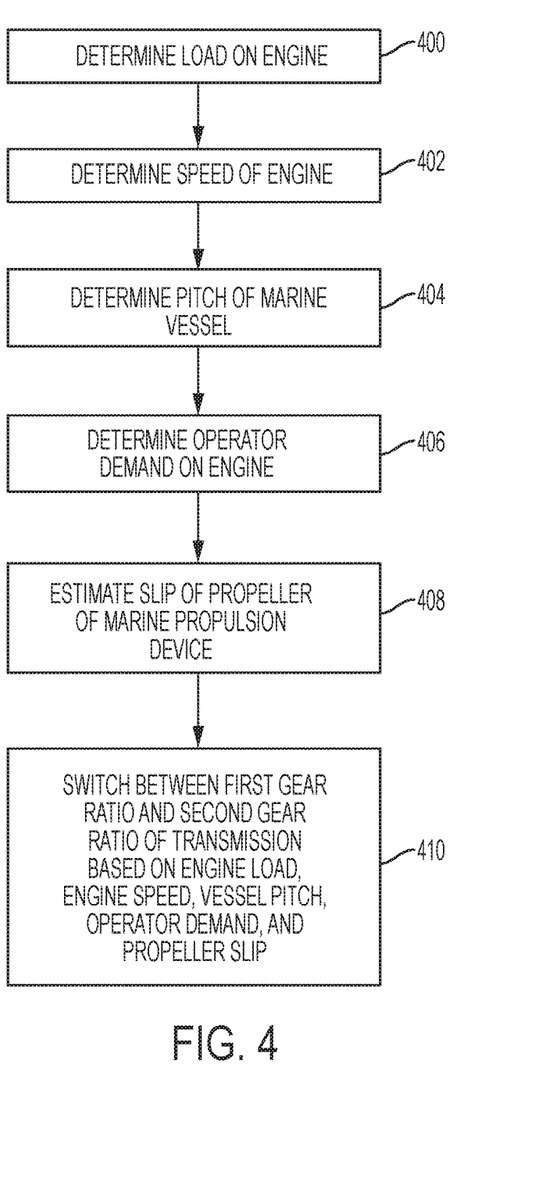
FIG. 4 illustrates another example of a method for controlling the transmission according to the present disclosure.

FIG. 4 illustrates another method according to the present disclosure. The method includes determining a load on the engine 16a or 16b as shown at 400; determining a speed of the engine 16a or 16b as shown at 402; and determining a pitch of the marine vessel 12 as shown at 404. The method may also include determining an operator demand on the engine 16a or 16b, as shown at 406. The operator demand may be determined from one of the above-noted operator input devices, such as the multi-functional display device 34, the joystick 38, or the throttle lever 42. The method also includes estimating a slip of the propeller 18a or 18b of the marine propulsion device 14a or 14b, as shown at 408, and as will be described further herein below. As shown at 410, the method includes switching between the first gear ratio and the second gear ratio based on the engine load determined at 400, the engine speed determined at 402, the vessel pitch determined at 404, the operator demand determined at 406, and the propeller slip determined 408. Note that any of the steps shown at 400-408 can be performed simultaneously or can be performed in an order other than that shown herein. Additionally, note that steps 406 and 408 are optional, such that the method may include switching between the first gear ratio and the second gear ratio based on the engine load determined at 400, the engine speed determined at 402, the vessel pitch determined at 404, and the propeller slip determined at 408. Alternatively, the method could include switching between the first gear ratio and the second gear ratio based on the engine load determined at 400, the engine speed determined at 402, the vessel pitch determined at 404, and the operator demand determined at 406.

Figure 5:
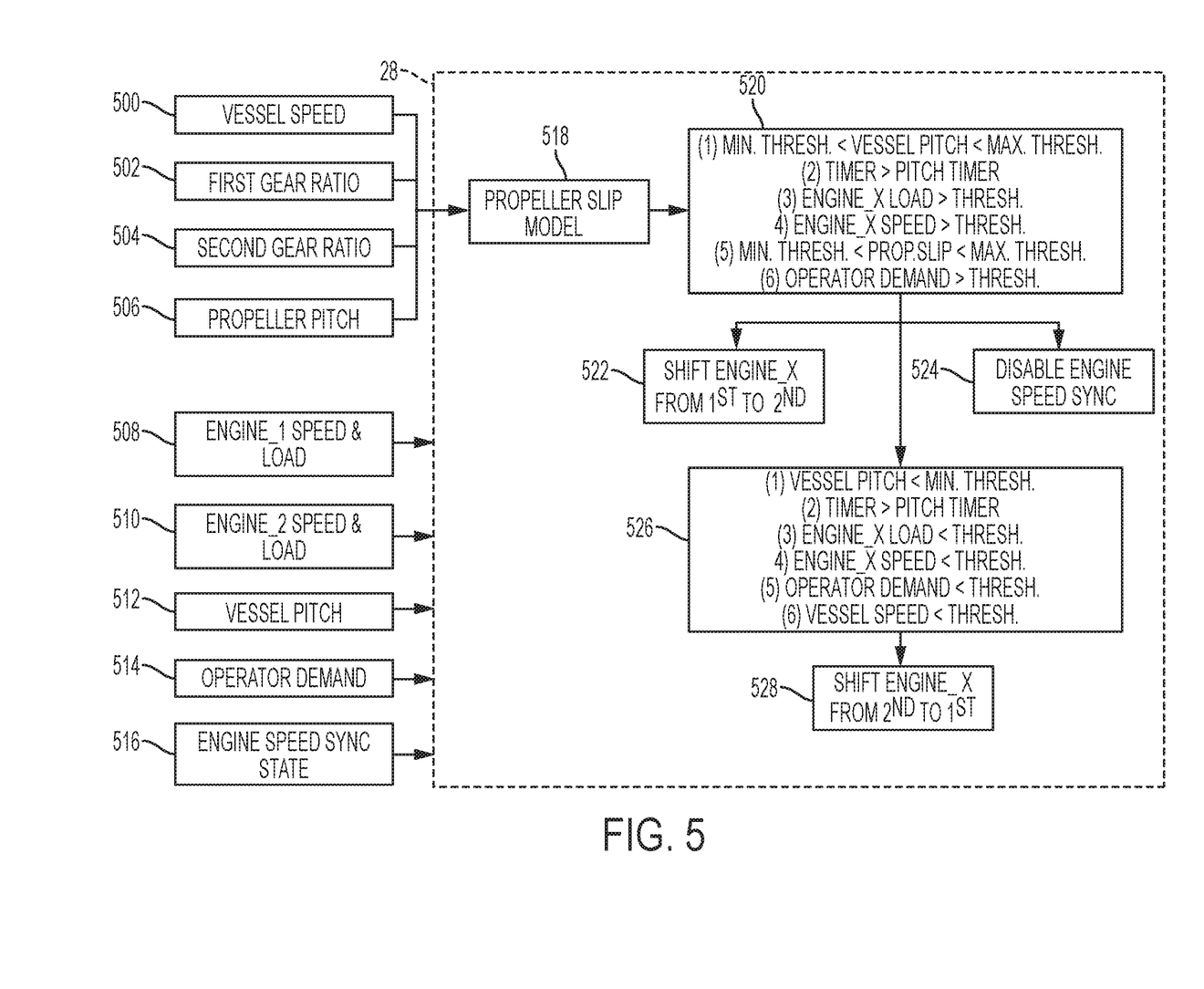
FIG. 5 illustrates inputs to and decisions made by a control module carrying out the methods of the present disclosure.

Now turning to FIG. 5, several inputs to and decisions made by the control module 28 in order to carry out the methods of the present disclosure will be described. The inputs to the control module 28 include the vessel speed 500, which may be received from the vessel speed sensor 30. The inputs also include a first gear ratio 502 of the transmissions 20a, 20b and a second gear ratio 504 of the transmissions 20a, 20b. Note that the first gear ratio of transmission 20a might differ from that of second transmission 20b, and the second gear ratio of transmission 20a might differ from that of transmission 20b; however, in the examples provided herein, the first gear ratio is greater than the second gear ratio in each transmission 20a, 20b. The value(s) of the first gear ratio 502 and the second gear ratio 504 are programmed into the control module 28 and saved in its memory for later recall when the methods of the present disclosure are carried out. The propeller pitch 506 is also saved in the memory of the control module 28. Note that the pitch of each propeller 18a, 18b might be different, and thus the propeller pitch 506 might include two different values.

Because two marine propulsion devices 14a and 14b are shown on the marine vessel 12 according to the present example, the present method will be described with respect to only two marine propulsion devices. However, as noted hereinabove, fewer or more marine propulsion devices could be provided on the marine vessel 12, and the principles described hereinabove and below would apply. A speed and a load of the first engine 16a of first marine propulsion device 14a are input as shown at 508. A speed and a load of the second engine 16b of second marine propulsion device 14b are input at 510. The engine speeds are determined by the engine speed sensors 22a and 22b. The engine loads are determined by the engine load sensors 24a and 24b. Vessel pitch 512, determined by vessel pitch sensor 26, is also provided to the control module 28. Operator demand 514 is also provided to the control module 28, and is received from one of the above-noted operator input devices, such as the multi-functional display device 34, the joystick 38, or the throttle lever 42.

In the event that more than one marine propulsion device is provided, an engine speed sync state 516 is also provided to the control module 28. The engine speed sync state is applicable when the marine propulsion device is one of multiple marine propulsion devices 14a, 14b on the marine vessel 12, and the multiple marine propulsion devices 14a, 14b are operable in an engine speed sync mode, in which an engine 16a, 16b of each marine propulsion device 14a, 14b is operated at the same engine speed. For example, the engine 16a may be the master engine, and the speed of slave engine 16b may be matched to the engine speed of the master engine 16a. Such matching is accomplished by way of the engine speed sensor 22a reporting the speed of engine 16a to the control module 28, which then commands the speed of engine 16b to match that of engine 16a. Feedback from engine speed sensor 22b is then provided to control module 28 and the fuel provided to engine 16b and throttle opening of engine 16b are adjusted until the speeds of the engines 16*a* and 16*b* match. The engine speed sync mode may be selectable by way of a command input via the user interface 36 of the multi-functional display device 34 or elsewhere at the helm 32, such as a particular button or an option on a touch-sensitive display screen. Thus, the engine speed sync mode may be turned on or off. The engine speed sync state 516 is therefore an indication as to whether the engine speed sync mode is enabled or disabled.

Still referring to FIG. 5, as noted hereinabove, the methods of the present disclosure may include estimating a slip of the propeller 18*a* or 18*b* of the marine propulsion device 14*a* or 14*b*. Note that the propeller slip may be different for each marine propulsion device 14*a*, 14*b*, and thus is determined separately for each marine propulsion device on the marine vessel 12. A propeller slip model 518 stored in the control module 28 is used to estimate the propeller slip. The propeller slip may be estimated based on the speed of the marine vessel 12, input at 500; a pitch of the propeller 18*a* or 18*b* in question, input at 506; and a value of at least one of the first gear ratio, input at 502, and the second gear ratio, input at 504, of the respective transmission 20*a* or 20*b* associated with the propeller 18*a* or 18*b* in question. The propeller slip model 518 provides an idea of how much the propeller 18*a* or 18*b* slips, and thus is a measure of the inefficiency of the propeller 18*a* or 18*b*. The propeller slip model 518 may be an input/output map, such as a look-up table, an equation, or similar. Given the above-noted inputs, an estimate of propeller slip is output and used by the control module 28 to carry out the remainder of the method of the present disclosure. The values in the propeller slip model 518 are calibrated values based on experimentation with different propulsion devices operating with different propellers of different pitches, at different vessel speeds, and with transmissions having different gear ratios.

As shown at 520, the control module 28 next makes a series of comparisons in order to determine if the transmission 20*a* or 20*b* of the respective marine propulsion device 14*a* or 14*b* should be shifted from the first gear ratio to the second gear ratio. In one example, the first gear ratio is higher than the second gear ratio, and the method includes switching from the first, higher gear ratio to the second, lower gear ratio in response to the control module 28 determining (1) that the vessel pitch 512 is within a predetermined vessel pitch window, defined between a minimum vessel pitch threshold and a maximum vessel pitch threshold. The vessel pitch window encompasses vessel pitch values at which the marine vessel 12 is estimated to be on-plane, as determined by experimentation and calibration of the minimum vessel pitch threshold and the maximum vessel pitch threshold of the vessel pitch window. Note that the minimum vessel pitch threshold may be a pitch of zero degrees or near zero degrees (e.g., 0-5 degrees) from horizontal, at which the marine vessel 12 would be oriented were it to be stationary or moving at slow speeds in calm water. The maximum vessel pitch threshold may be a pitch at or near which the marine vessel 12 would be oriented while it is transitioning, just before getting up on-plane. This is because the marine vessel 12 will level out with respect to horizontal (but not completely back to zero or near-zero degrees) once it has completed transitioning and has rolled over on-plane. Therefore, the vessel pitch window includes values that are greater than zero (or near zero), but are also less than the pitch at which the marine vessel 12 is oriented while transitioning to getting up on-plane. In other examples, the control module 28 may make a determination as to whether the vessel pitch value has changed in such a way that would indicate the marine vessel 12 was accelerating from slower speeds, through the plowing and transition phases, and eventually has rolled over on-plane. For example, before commanding the transmission 20*a* or 20*b* to switch to operating at the second gear ratio, the control module 28 may require that the vessel pitch changed from a zero or near-zero value, to a value greater than the maximum vessel pitch threshold, and then dropped back below the maximum vessel pitch threshold to being within the vessel pitch window.

Additionally, the control module 28 may cause the transmission 20*a* or 20*b* to switch from transmitting torque at the first, higher gear ratio to transmitting torque at the second, lower gear ratio in response to determining (2) that the vessel pitch 512 has been within the vessel pitch window for longer than a predetermined period of time, denoted herein as "pitch timer." Requiring that the pitch has been within the vessel pitch window for longer than the calibrated pitch timer value (e.g., 5-15 seconds) ensures that the marine vessel 12 has been up on-plane and remained there for long enough that it can be assumed the operator intends to maintain the marine vessel 12 on-plane for a while. This also prevents the control module 28 from mistaking transient pitch values due to rough water conditions as indicating that the marine vessel 12 is on-plane. Requiring that the vessel pitch 512 has been within the vessel pitch window for longer than a predetermined period of time therefore prevents toggling back and forth between operating the transmission 20*a* or 20*b* at the first gear ratio and operating the transmission 20*a* or 20*b* at the second gear ratio, which would be inefficient and would wear out the clutches.

The control module 28 may also determine (3) if the engine load provided at 508 or 510 is greater than a predetermined engine load threshold, which threshold may be a calibrated value saved in the memory of the control module 28. The control module 28 may also determine (4) if the engine speed provided at 508 or 510 is greater than a predetermined engine speed threshold, also calibrated and saved in the memory of the control module 28. Requiring that the respective engine's load and speed are greater than predetermined thresholds will ensure that the engine is operating under conditions such that shifting the transmission 20*a* or 20*b* into second gear, which provides lower torque and faster speeds relative to the first gear, will enhance operation of the marine propulsion system 10 while it is on-plane. Some examples of load and speed criteria that may be required to be met are provided in U.S. Pat. No. 5,711,742, which was incorporated by reference herein above. Note that the engine load and speed thresholds might change in conjunction with one another, such that the engine load threshold is different depending on the engine speed, or vice versa. Optimal values of the load and speed thresholds can be determined experimentally and/or based on propeller type and pitch. The present inventors have discovered that when a marine vessel 12 is struggling to get on-plane, even if the engine load and speed are above their respective thresholds, the marine vessel 12 might not actually be on-plane. It would not be helpful to shift into second gear at this time, as the torque output to the propeller 18*a* or 18*b* would then decrease, making it even header for the marine vessel 12 to get on-plane. Thus, requiring that vessel pitch 512 is also within the vessel pitch window can provide greater certainty that the marine vessel 12 has truly rolled over on-plane.

The control module 28 may also determine (5) whether the propeller slip, determined from propeller slip model 518, is greater than a minimum slip threshold and less than a maximum slip threshold. The slip thresholds may be calibrated and saved in the memory of the control module 28. The slip thresholds may be calibrated such that the control module 28 ensures that the marine propulsion device 14a or 14b is operating in a high slip region, but is not slipping so much that there is excess cavitation. The control module 28 may also determine (6) whether the operator demand 514 is greater than an operator demand threshold, which may also be calibrated and saved in the memory of the control module 28. Requiring that the operator demand 514 is greater than a threshold ensures that the operator has requested acceleration of the marine vessel 12 to speeds that would generally correspond to those at which the marine vessel 12 would be operating on-plane. As an alternative to the operator demand 514, the position of the throttle valve on the respective engine 16a or 16b could be used to determine if the transmission 20a or 20b can be shifted from first gear to second gear.

If one or more of the required determinations at 520 is false, then the control module 28 will not shift the transmission 20a or 20b from operating at the first gear ratio to operating at the second gear ratio. Rather, the transmission 20a or 20b will remain at the current gear ratio. Of course, one or more of the conditions noted at 520 may not be required, such as the condition relating to how long the marine vessel 12 has been on-plane, whether the propeller slip is within the propeller slip window, and/or whether the operator demand is greater than the threshold. On the other hand, if all of the required determinations at 520 are true, and again note that only select determinations may be required, the control module 28 will continue to 522 and will shift the respective engine 16a or 16b from first gear to second gear. At the same time, if the engine speed sync state 516 was determined to be true, i.e., the speeds of engines 16a and 16b were synchronized, the control module 28 will disable the engine speed sync mode as shown at 524 while switching the transmission 20a or 20b between operating at the first gear ratio and operating at the second gear ratio. This is because the determinations as to whether the transmissions 20a or 20b should shift from one gear ratio to another may be made independently, and it may not be desirable to match the engine speed of one engine to that of the other engine if only one of the engine's transmissions 20a or 20b is shifting. Shifting from one gear ratio to another will necessarily cause at least a temporary change in transmission output speed (e.g., by 200 RPM), which change in transmission output speed may not be desired from the non-shifting marine propulsion device.

The control module 28 also makes a series of determinations at 526, in order to determine if the transmission 20a or 20b should be switched from operating at the second, lower gear ratio to operating at the first, higher gear ratio. For example, the control module 28 will command a switch from the second, lower gear ratio to the first, higher gear ratio in response to determining (1) that the vessel pitch 512 is less than a predetermined minimum vessel pitch threshold. The minimum vessel pitch threshold was described hereinabove with respect to box 520. Accordingly, the marine vessel 12 is estimated to be off-plane at vessel pitch values less than the minimum vessel pitch threshold. The control module 28 may also determine (2) whether the vessel pitch has been less than the minimum vessel pitch threshold for longer than a predetermined period of time, indicating that the operator intends to operate the marine vessel 12 off-plane for some extended period. The value of the "pitch timer" here may be the same as that described hereinabove with respect to box 520.

The control module 28 may also determine (3) whether the engine load provided at 508 or 510 is less than a predetermined engine load threshold; (4) whether the engine speed provided at 508 or 510 is less than a predetermined engine speed threshold; and/or (5) whether the operator demand 514 is less than a predetermined operator demand threshold. Any of these thresholds may be the same as or different from the thresholds described with respect to box 520. For example, hysteresis may be provided in order to prevent the flags associated with the engine load, engine speed, and/or operator demand from toggling back and forth. The control module 28 may also determine (6) whether the vessel speed 500 is less than a predetermined vessel speed threshold. Requiring that operator demand and/or vessel speed has dropped below a threshold may help ensure that the operator is truly requesting slower vessel speeds, and no longer wishes to operate on-plane.

If one or more of the required determinations at box 526 is false, the control module 28 will maintain the transmission 20a or 20b in its current gear. Note, however, that not all of the determinations at box 526 are necessarily required. For example, it may be sufficient to require that the vessel pitch is less than the minimum vessel pitch threshold, that the operator demand is less than the operator demand threshold, and that the vessel speed is less than the vessel speed threshold before the transmission 20a or 20b will be commanded to shift from operating at the second gear ratio to operating at the first gear ratio. On the other hand, if each of the required conditions at box 526 is true, and again note that not every condition listed hereinabove is necessarily required, the control module 28 will proceed to shift the respective transmission 20a or 20b from operating at the second gear ratio to operating at the first gear ratio, as shown at 528.

As noted briefly hereinabove, it is not necessary that the transmissions of all marine propulsion devices shift from first to second or from second to first at the same time. The above-noted methodology was described with respect to shifting the transmission 20a or 20b of only one marine propulsion device 14a or 14b at a time, based on that particular propulsion device's operating conditions. However, if three or four marine propulsion devices are provided on the marine vessel 12, it may be desirable to shift the inner propulsion device(s) at the same time, and to shift the outer propulsion devices at the same time. Alternatively, in other situations, it may be desirable to shift all propulsion devices at the same time. This may be done after all propulsion devices' operating conditions meet the above-noted criteria, or after only one or a majority of the propulsion device's operating conditions meet the above-noted criteria. Note that if the engine speed sync mode was enabled, and then disabled during shift according to box 524, the engine speed sync mode may thereafter be re-enabled once all marine propulsion devices have shifted to operating at the new gear ratio.

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

What is claimed is:

1. A method for controlling a multi-speed transmission for an engine powering a marine propulsion device on a marine vessel, the method being carried out by a control module and comprising:
    determining a load on the engine;
    determining a speed of the engine;
    determining a pitch of the marine vessel; and
    switching between a first gear ratio and a second gear ratio of the transmission based on the engine load, the engine speed, and the vessel pitch;
    wherein the first gear ratio is higher than the second gear ratio, and further comprising switching from the second, lower gear ratio to the first, higher gear ratio in response to determining the following:
        the engine load is less than a predetermined engine load threshold;
        the engine speed is less than a predetermined engine speed threshold; and
        the vessel pitch is less than a predetermined minimum vessel pitch threshold.

2. The method of claim 1, further comprising:
    determining an operator demand on the engine; and
    switching between the first gear ratio and the second gear ratio based on the engine load, the engine speed, the vessel pitch, and the operator demand.

3. The method of claim 1, further comprising:
    estimating a slip of a propeller of the marine propulsion device; and
    switching between the first gear ratio and the second gear ratio based on the engine load, the engine speed, the vessel pitch, and the propeller slip.

4. The method of claim 3, further comprising estimating the propeller slip based on a speed of the marine vessel, a pitch of the propeller, and a value of at least one of the first gear ratio and the second gear ratio.

5. The method of claim 1, further comprising:
    determining an operator demand on the engine;
    estimating a slip of a propeller of the marine propulsion device; and
    switching between the first gear ratio and the second gear ratio based on the engine load, the engine speed, the vessel pitch, the operator demand, and the propeller slip.

6. The method of claim 1, further comprising switching from the first, higher gear ratio to the second, lower gear ratio in response to determining the following:
    the engine load is greater than the predetermined engine load threshold;
    the engine speed is greater than the predetermined engine speed threshold; and
    the vessel pitch is within a predetermined vessel pitch window.

7. The method of claim 6, wherein the vessel pitch window encompasses vessel pitch values at which the marine vessel is estimated to be on-plane.

8. The method of claim 1, wherein the marine vessel is estimated to be off-plane at vessel pitch values less than the predetermined minimum vessel pitch threshold.

9. The method of claim 1, wherein the marine propulsion device is one of multiple marine propulsion devices on the marine vessel;
    wherein the multiple marine propulsion devices are operable in an engine speed sync mode, in which an engine of each marine propulsion device is operated at the same engine speed; and
    further comprising disabling the engine speed sync mode while switching between the first gear ratio and the second gear ratio.

10. A marine propulsion system for a marine vessel, the marine propulsion system comprising:
    an engine;
    a propeller configured to be coupled in torque-transmitting relationship with the engine;
    a transmission configured to transmit torque from the engine to the propeller at one of at least a first gear ratio and a second gear ratio;
    an engine speed sensor measuring a speed of the engine;
    a vessel pitch sensor measuring a pitch of the marine vessel; and
    a control module in signal communication with the engine speed sensor and the vessel pitch sensor;
    wherein the control module causes the transmission to switch between transmitting torque at the first gear ratio and transmitting torque at the second gear ratio based on a load on the engine, the engine speed, and the vessel pitch; and
    wherein the control module causes the transmission to transmit torque at the first gear ratio in response to the vessel pitch indicating that the marine vessel is off-plane, and causes the transmission to transmit torque at the second gear ratio in response to the vessel pitch indicating that the marine vessel is on-plane;
    wherein the first gear ratio is higher than the second gear ratio, and wherein the control module causes the transmission to switch from transmitting torque at the second, lower gear ratio to transmitting torque at the first, higher gear ratio in response to determining the following:
        the engine load is less than a predetermined engine load threshold;
        the engine speed is less than a predetermined engine speed threshold; and
        the vessel pitch is less than a predetermined minimum vessel pitch threshold, below which the marine vessel is estimated to be off-plane.

11. The marine propulsion system of claim 10, wherein the control module causes the transmission to switch from transmitting torque at the first, higher gear ratio to transmitting torque at the second, lower gear ratio in response to determining the following:
    the engine load is greater than the predetermined engine load threshold;

the engine speed is greater than the predetermined engine speed threshold; and the vessel pitch is within a predetermined vessel pitch window encompassing vessel pitch values at which the marine vessel is estimated to be on-plane.

12. The marine propulsion system of claim 11, wherein the control module causes the transmission to switch from transmitting torque at the first, higher gear ratio to transmitting torque at the second, lower gear ratio in response to determining that the vessel pitch has been within the vessel pitch window for longer than a predetermined period of time.

13. The marine propulsion system of claim 10, further comprising an operator input device for inputting an operator demand on the engine to the control module;

wherein the control module causes the transmission to switch between transmitting torque at the first gear ratio and transmitting torque at the second gear ratio based on the engine load, the engine speed, the vessel pitch, and the operator demand.

14. The marine propulsion system of claim 13, wherein the operator input device is a throttle lever.

15. The marine propulsion system of claim 10, further comprising a vessel speed sensor providing a speed of the marine vessel to the control module;

wherein the control module estimates a slip of the propeller based on the vessel speed, a pitch of the propeller, and a value of at least one of the first gear ratio and the second gear ratio; and wherein the control module causes the transmission to switch between transmitting torque at the first gear ratio and transmitting torque at the second gear ratio based on the engine load, the engine speed, the vessel pitch, and the propeller slip.

16. The marine propulsion system of claim 10, further comprising:

an operator input device for inputting an operator demand on the engine to the control module; and a vessel speed sensor providing a speed of the marine vessel to the control module;

wherein the control module estimates a slip of the propeller based on the vessel speed, a pitch of the propeller, and a value of at least one of the first gear ratio and the second gear ratio; and wherein the control module causes the transmission to switch between transmitting torque at the first gear ratio and transmitting torque at the second gear ratio based on the engine load, the engine speed, the vessel pitch, the operator demand, and the propeller slip.

17. The marine propulsion system of claim 10, further comprising an engine load sensor providing the engine load to the control module;

wherein the engine load sensor comprises one of a pressure sensor sensing a pressure of air in an intake manifold of the engine and a throttle valve sensor measuring a position of a throttle valve of the engine.

18. The marine propulsion system of claim 10, wherein the vessel pitch sensor is an inertial measurement unit.

19. A method for controlling a multi-speed transmission for an engine powering a marine propulsion device on a marine vessel, the method being carried out by a control module and comprising:

determining a load on the engine;

determining a speed of the engine;

determining a pitch of the marine vessel; and switching between a first gear ratio and a second gear ratio of the transmission based on the engine load, the engine speed, and the vessel pitch;

wherein the marine propulsion device is one of multiple marine propulsion devices on the marine vessel;

wherein the multiple marine propulsion devices are operable in an engine speed sync mode, in which an engine of each marine propulsion device is operated at the same engine speed; and further comprising disabling the engine speed sync mode while switching between the first gear ratio and the second gear ratio.

* * * * *